United States Patent
Fan et al.

(10) Patent No.: US 7,457,845 B2
(45) Date of Patent: Nov. 25, 2008

(54) METHOD AND SYSTEM FOR TCP/IP USING GENERIC BUFFERS FOR NON-POSTING TCP APPLICATIONS

(75) Inventors: Kan Frankie Fan, Diamond Bar, CA (US); Scott Sterling McDaniel, Villa Park, CA (US)

(73) Assignee: Broadcom Corporation, Irvine, CA (US)

( * ) Notice: Subject to any disclaimer, the term of this patent is extended or adjusted under 35 U.S.C. 154(b) by 957 days.

(21) Appl. No.: 10/644,205

(22) Filed: Aug. 20, 2003

(65) Prior Publication Data

US 2004/0047361 A1   Mar. 11, 2004

Related U.S. Application Data

(60) Provisional application No. 60/405,539, filed on Aug. 23, 2002.

(51) Int. Cl.
    *G06F 15/167* (2006.01)
(52) U.S. Cl. ............... 709/213; 709/214; 710/56
(58) Field of Classification Search ........... 709/213, 709/214, 215, 216, 250, 227, 201, 249; 714/4; 710/52, 53, 54, 55, 56, 57
    See application file for complete search history.

(56) References Cited

U.S. PATENT DOCUMENTS

| | | |
|---|---|---|
| 5,931,915 A | 8/1999 | Benner et al. |
| 2001/0051972 A1 | 12/2001 | Eydelman et al. |
| 2002/0156927 A1 * | 10/2002 | Boucher et al. ............. 709/250 |
| 2003/0014544 A1 * | 1/2003 | Pettey ........................ 709/249 |
| 2003/0014684 A1 * | 1/2003 | Kashyap ........................ 714/4 |
| 2003/0110206 A1 * | 6/2003 | Osokine ..................... 709/201 |
| 2003/0204634 A1 * | 10/2003 | Pinkerton et al. ........... 709/250 |
| 2003/0208600 A1 * | 11/2003 | Cousins ..................... 709/227 |
| 2004/0003126 A1 * | 1/2004 | Boucher et al. ............. 709/250 |
| 2004/0133713 A1 | 7/2004 | Elzur |

FOREIGN PATENT DOCUMENTS

| | | |
|---|---|---|
| WO | 00/41358 | 7/2000 |
| WO | 01/35233 | 5/2001 |

* cited by examiner

*Primary Examiner*—Le Luu
(74) *Attorney, Agent, or Firm*—McAndrews, Held & Malloy, Ltd.

(57) ABSTRACT

Aspects of the invention for posting buffers for a non-posting TCP application may comprise posting at least one generic buffer located in a memory external to a host adapter and transferring incoming data for a TCP connection to the posted generic buffer prior to the non-posting TCP application posting a TCP application buffer for the incoming data. At least one generic buffer may be allocated from a pool of available generic buffers upon receipt of the incoming TCP connection data. At least a portion of the incoming data may be stored in the allocated generic buffer if the TCP application buffer is unable to accommodate the incoming data. The method may further determining whether the incoming data for the TCP connection transferred to the posted generic buffer is in sequence and ordering the incoming data based on a sequence number if the incoming data is out of sequence.

31 Claims, 8 Drawing Sheets

METHOD AND SYSTEM FOR TCP/IP USING GENERIC BUFFERS FOR NON-POSTING TCP APPLICATIONS

RELATED APPLICATIONS

This application makes reference to, claims priority to and claims the benefit of U.S. Provisional Application Ser. No. 60/405,539 entitled "Remote Direct Memory Access Over TCP/IP Using Generic Buffers For Non-Posting TCP Applications" filed on Aug. 23, 2002.

The above referenced application is incorporated herein by reference in its entirety.

FIELD OF THE INVENTION

Embodiments of the present application relate generally to the control of networking bandwidth. In particular, certain embodiments of the invention relate to a method and system for handling non-posting TCP applications.

BACKGROUND OF THE INVENTION

High-speed digital communication networks over copper, optical fiber and other hybrid media are used in many digital communication systems and storage applications. As these networks continue to evolve in order meet ever-increasing bandwidth requirements, new protocols are being developed to more efficiently transfer information throughout these networks. For example, the well-known IEEE P802.3ae draft 5 specifications describe requirements for 10 Gigabit Ethernet (GbE) applications, which may be used in communication networks and storage area networks (SANs).

Notwithstanding, processing power and memory bandwidth of devices used in applications such 10 GbE have generally lagged behind the increased demand for networking bandwidth and faster data rates. In networks such as the Internet, which utilize the well-known transmission control protocol/internet protocol (TCP/IP), data copying operations utilize a great deal of CPU and memory resources. In addition to diminished processing capacity, there is also increased latency, which may significantly affect time critical applications such as voice applications. A major consequence is that network computing nodes become bottlenecks, which may significantly diminish system performance and throughput.

Some TCP/IP networks typically employ a TCP offload engine (TOE) to facilitate more efficient packet processing. A TOE is an intelligent network adapter that may be configured to offload most or all of the TCP/IP protocol processing from a host processor or CPU to the network adapter. One of the primary challenges associated with building a TCP offload device involves the handling of applications that do not post or allocate buffers before the data is received. Current TCP offload adapters store all their received data locally on the adapter in buffers known as TCP segment buffers. The received data may remain stored in the TCP segment buffers on the adapter until the application posts or allocates a buffer for the data. When the buffer is posted, the adapter copies the data from the on-chip TCP segment buffers to the posted buffers in the host.

Figure 1:
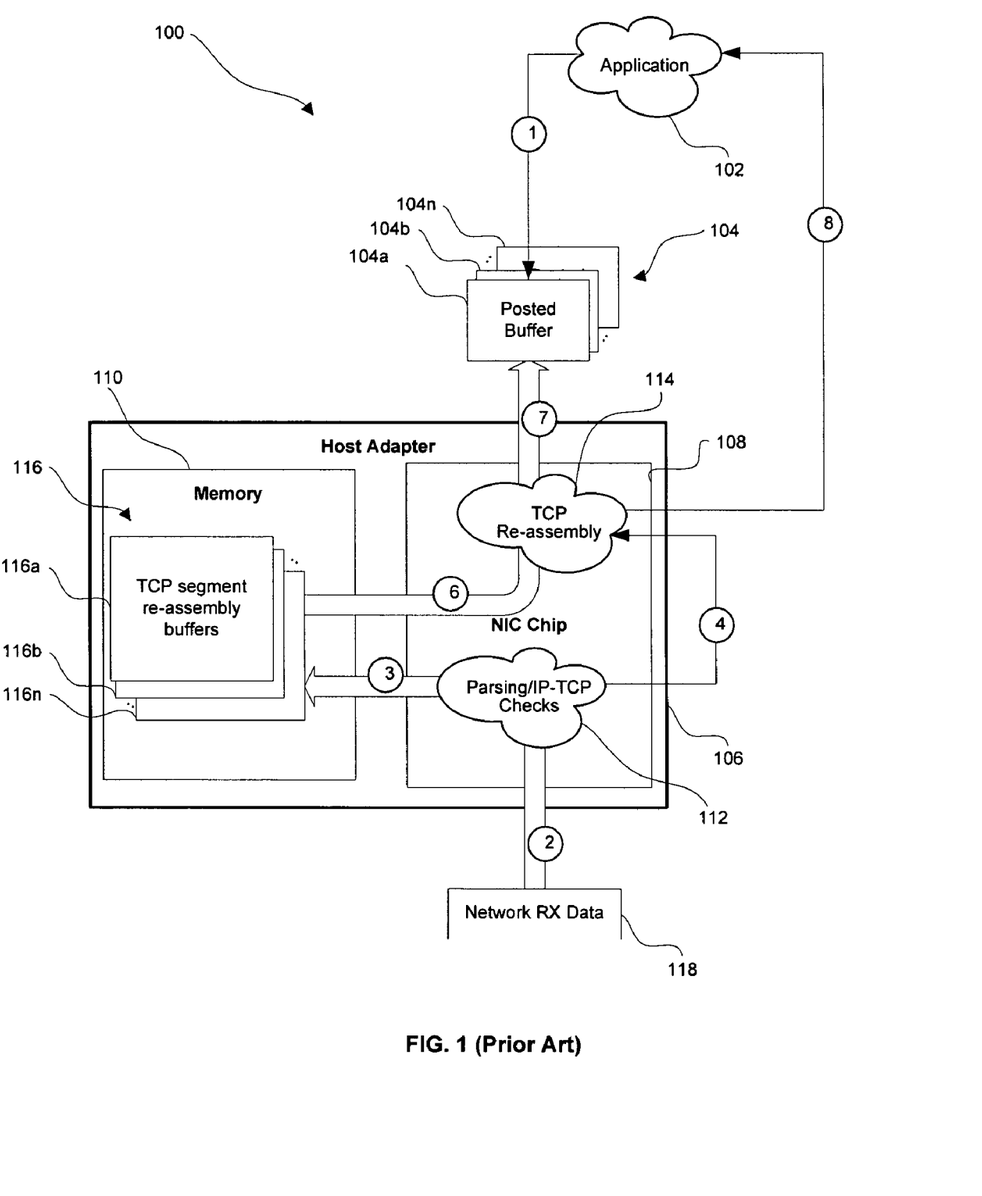
FIG. 1 illustrates a block diagram of a conventional TCP offload system 100 that utilizes pre-posted buffers.

FIG. 1 illustrates a block diagram of a conventional TCP offload system 100 that utilizes pre-posted buffers. Referring to FIG. 1, there is shown an application 102 having a plurality of TCP application posted buffers 104, including buffers 104a, 104b, . . . , 104n. Host adapter 106 may include a network interface card (NIC) processor or chip 108 and memory 110. NIC processor 108 may include a parsing/IP-TCP checks process 112 and a TCP re-assembly process 114. The memory 110 for the host adapter 106 may include a plurality of pre-allocated buffers TCP segment reassembly buffers 116, including 116a, 116b, . . . , 116n. Host adapter 106 may receive data 118 from a network.

In operation, application 102 may pre-post the TCP application posted buffers 104, for example 104a. A buffer post handler process or processor, which may be integrated within application 102, may typically post buffers for all the data it expects to receive. Since application 102 knows that data may be received from a specific connection, the buffer post handler process may post buffers before the data is received. Subsequent to the posting of the buffers, NIC processor 108 may receive data 118 packets from the network for a particular connection. The data packets may generally contain an application header followed by a large or small amount of data. In current systems such as system 100, process 112 may be configured to process these data packets for IP and TCP, but no data placement is generally done, other than to store the TCP data segments in the TCP segment re-assembly buffers 116, such as 116a. Process 112 may notify the TCP re-assembly process 114 that more TCP segment re-assembly buffers 116 are available for re-assembly processing.

The TCP re-assembly process 114 may consult TCP application posted buffers 104a to determine which posted buffers are available. In this case, the TCP re-assembly process 114 may find all the posted buffers it needs to store the data. The TCP re-assembly process 114 may then access the TCP re-assembly buffer 116 and read the previously stored information if a consistent stream of TCP bytes are available. The TCP re-assembly process 114 may then write the re-assembled TCP bytes to the TCP application posted buffers 104, in this case 104a. Upon completion of the writing process, TCP re-assembly process 114 may notify application 102 that the posted buffers are now full. At this point, the application may process the complete received command, which includes both header and data.

In high-speed applications, typically of the order of about 10 gigabits per second, the system 100 of FIG. 1 may encounter problems when processing a large volume of data associated with these applications. In order to remain TCP compliant, the host adapter 106 must supply one window size, which is approximately 16 Kbytes for every connection. In a typical case where there may be approximately 1000 connections, about 16 Mbytes of memory would be required. However, high-speed applications such as 10 GbE, require much larger window sizes. In a case where the window size increases to approximately 512 Kbytes for every connection and there are 1000 connections, then approximately 512 Mbytes of memory would be required. Therefore, the memory requirements may become tremendous and may be prohibitively expensive and/or too large to integrate inside a single chip on the host adapter 106.

Figure 2:
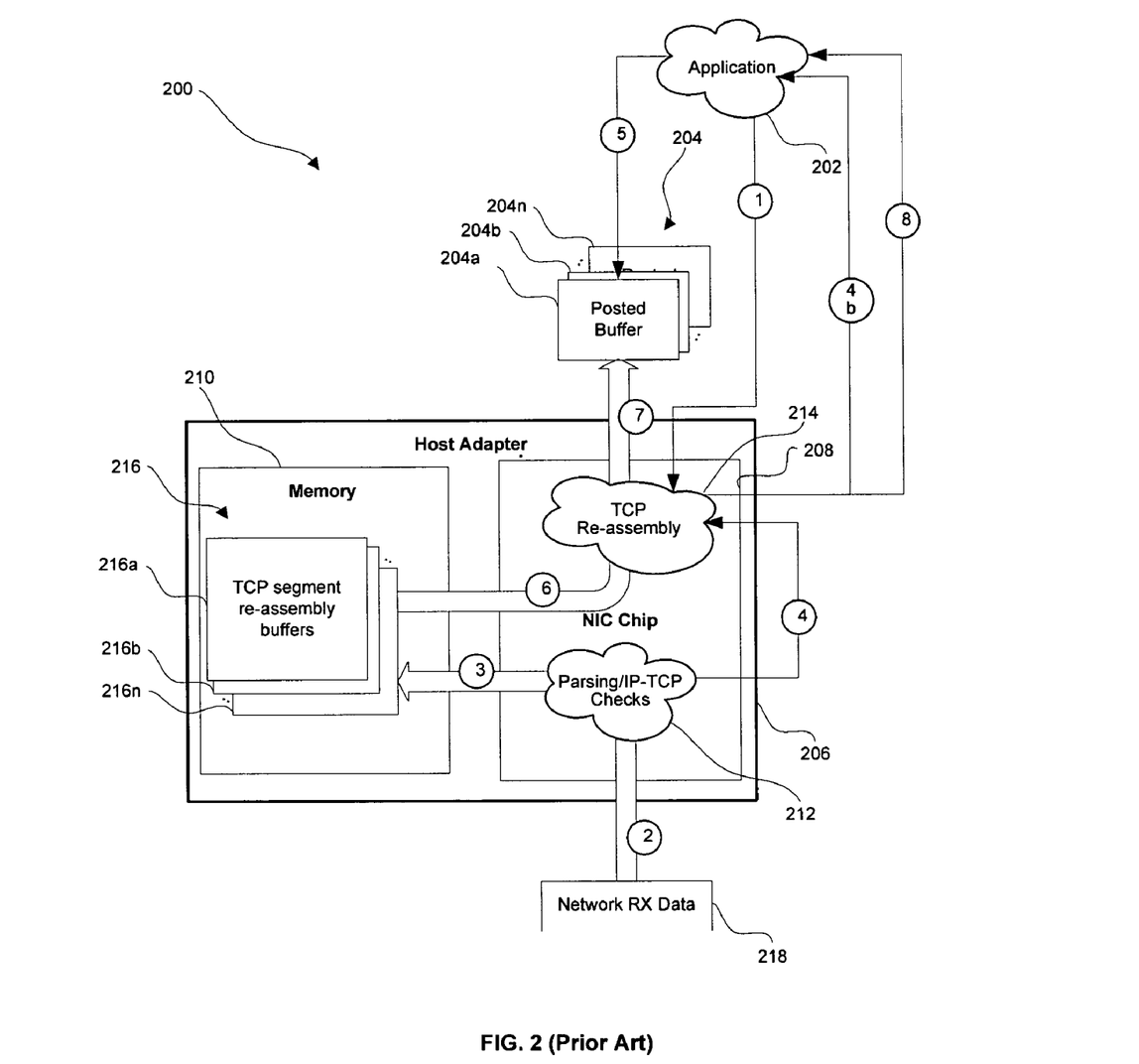
FIG. 2 illustrates a block diagram of a conventional TCP offload system 200 that utilizes non-pre-posted buffers.

A similar situation may occur with conventional systems which have non-pre-posted buffers. FIG. 2 illustrates a block diagram of a conventional TCP offload system 200 that may utilize non-pre-posted buffers. Referring to FIG. 2, there is shown an application 202 having a plurality of TCP application posted buffers 204, namely buffers 204a, 204b, . . . , 204n. Host adapter 206 may include a network interface card (NIC) processor or chip 208 and memory 210. NIC processor 208 may include a parsing/IP-TCP checks process 212 and a TCP re-assembly process 214. The memory 210 for the host adapter 206 may include a plurality of pre-allocated TCP segment reassembly buffers 216, namely 216a, 216b, . . . , 216n. Host adapter 206 may receive data 218 from a network.

In operation, application 202 may be configured to receive data from a significantly large plurality of connections. In this case, the pre-posting of TCP application posted buffers 204 would be a waste of resources, since only some of the plurality of connections is active over any given period of time. Application 202 may be configured to issue a "peek" operation to the connection to indicate that the application 202 should be notified when any data is received. The NIC processor 208 may then receive data 218 packets for a specified connection. The data packets generally contain an application header followed by a large or small amount of data. In current systems such as system 200, process 212 may be configured to process these data packets for IP and TCP, but no data placement is generally done, other than to store the TCP data segments in the TCP segment re-assembly buffers 216, such as 216a. Process 212 may notify the TCP re-assembly process 214 that more TCP segment re-assembly buffers 216 are available for re-assembly processing.

The TCP re-assembly process 214 may consult the TCP application posted buffers 204 to determine which posted buffers are available. In this case, the TCP re-assembly process 214 may find that there are no available TCP application posted buffers in which to store the data. Notwithstanding, TCP re-assembly process 214 may recognize that that a "peek" request was made. An indication for the data may subsequently be forwarded to the application 202. Application 202 may then, normally post TCP application buffers to handle the received data. This action may dispatch a message to the TCP re-assembly process 214 to indicate that new buffers are available. The TCP re-assembly process 214 may then access the TCP re-assembly buffer 216 and read the previously stored information if a consistent stream of TCP bytes are available. The TCP re-assembly process 214 may then write the re-assembled TCP bytes to the TCP application posted buffers 204, in this case 204a. Upon completion of the writing process, TCP re-assembly process 214 may notify application 202 that the posted buffers are now full. At this point, the application may process the complete received command, which includes both header and data.

In high-speed applications, the system 200 of FIG. 2 may encounter the same problems as the system 100 of FIG. 1, when processing a large volume of data associated with these applications. The problems are aggravated because the application 202 postpones posting of TCP application buffers until after received data has been indicated such that the buffers space on chip 216 is routinely used up to the full window size for a large number of connection.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Certain embodiments of the invention provide a method and system for posting buffers for a non-posting TCP application. Aspects of the invention may be found in a method and system for posting buffers for a non-posting TCP application. Aspects of the method may comprise posting at least one generic buffer located in a memory external to a host adapter and transferring incoming data for a TCP connection to the posted generic buffer prior to the non-posting TCP application posting a TCP application buffer for the incoming data. At least one generic buffer may be allocated from a pool of available generic buffers upon receipt of the incoming TCP connection data. At least a portion of the incoming data may be stored in the allocated generic buffer if the TCP application buffer is unable to accommodate the incoming data.

The method may further determining whether the incoming data for the TCP connection transferred to the posted generic buffer is in sequence and ordering the incoming data based on a sequence number if the incoming data is out-of-sequence (OOS). Incoming data in the generic buffers may also be assembled if they are out-of-sequence. At least one posted generic buffer may be polled by the non-posting TCP application to determine when the posted generic buffer contains data for the TCP connection. In response to the polling, the non-posting TCP application may be notified when the incoming data is stored in the posted generic buffer. At least one generic buffer may be posted prior to transferring the incoming data for a TCP connection to at least a portion of available TCP application buffers. At least one posted generic buffer may be located in a memory internal to the host adapter.

Another aspect of the invention may provide a machine-readable storage, having stored thereon a computer program having at least one code section for posting buffers for a non-posting TCP application. The at least one code section may be executable by a machine, thereby causing the machine to perform the steps described above in the method for posting buffers for a non-posting TCP application.

Aspects of the system may comprise posting at least one generic buffer located in a memory external to a host adapter by a processor. The processor may be at least one of a NIC, a generic buffer handler, a buffer post handler, a TCP notifier and a TCP data placement processor. In any case, the processor may be adapted to transfer incoming data for a TCP connection to the posted generic buffer prior to the non-posting TCP application posting a TCP application buffer for the incoming data. At least one generic buffer may be allocated by the processor from a pool of available generic buffers upon receipt of the incoming TCP connection data. The processor may store a portion of the incoming data in the allocated generic buffer if the TCP application buffer is unable to accommodate the incoming data.

The processor may further be adapted to determine whether the incoming data for the TCP connection transferred to the posted generic buffer is in sequence and order/reorder the incoming data based on a sequence number if the incoming data is out-of-sequence. Incoming data in the generic buffers may also be assembled by the processor if they are out-of-sequence. At least one posted generic buffer may be polled by the non-posting TCP application to determine when the posted generic buffer contains data for the TCP connection. In response to the polling, the non-posting TCP application may be notified by the processor when the incoming data is stored in the posted generic buffer. At least one generic buffer may be posted by the processor prior to transferring the incoming data for a TCP connection to at least a portion of available TCP application buffers. In this regard, the at least one posted generic buffer may be located in a memory internal to the host adapter.

These and other advantages, aspects and novel features of the present invention, as well as details of an illustrated embodiment thereof, will be more fully understood from the following description and drawings.

DETAILED DESCRIPTION OF THE INVENTION

Aspects of the present invention provide a method and system for posting buffers for a non-posting TCP application so that a large memory may not be required on, for example, a TOE adapter. The method may include posting at least one posted buffer, namely a generic buffer, on behalf of the TCP application. Upon receiving data for a connection, the a generic posted buffer may be allocated from a pool of available generic posted buffers for placement of the received data. Incoming data for the connection may subsequently be transferred to at least one of the allocated generic buffers if the TCP application posted buffer is unable to accommodate the incoming data.

In response to a polling operation by the TCP application while the data may still be in the generic buffer, a notification may be provided to the TCP application to alert the TCP application that data may be available for a TCP connection. The TCP application may post a buffer for data that has already been received into the generic pre-posted buffer. Incoming data for the connection may be transferred from the posted generic buffer to the TCP application posted buffer. The TCP application may be notified when the posted buffer is full. If incoming data stored in the generic buffers are out of sequence, then the generic buffers may be assembled and placed in a proper sequence in the posted buffer before the TCP application is notified that it's buffer is full.

Figure 3:
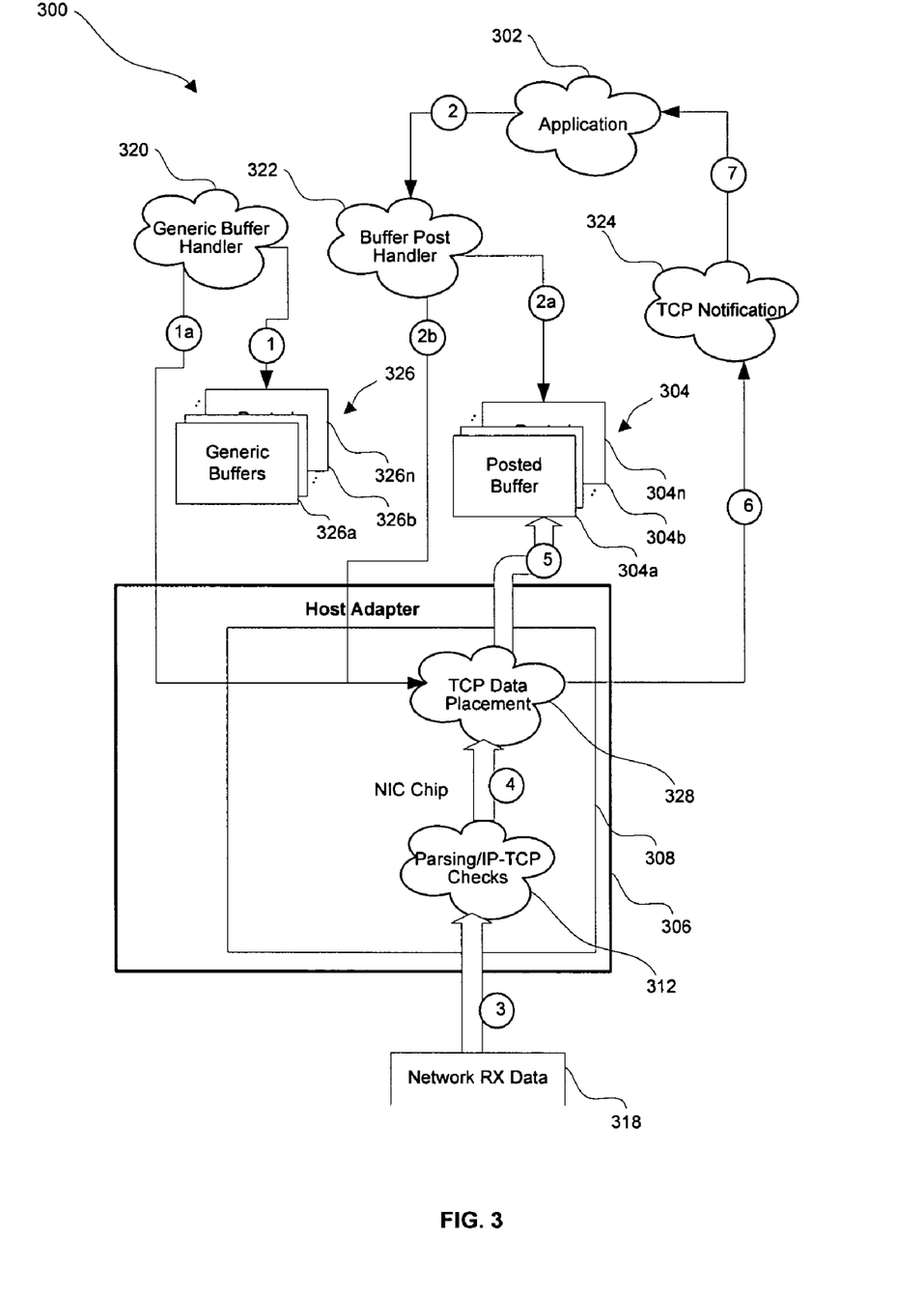
FIG. 3 illustrates a block diagram of a TCP offload system 300 that utilizes pre-posted buffers in accordance with one embodiment of the present invention.

FIG. 3 illustrates a block diagram of a TCP offload system 300 that utilizes generic buffers in accordance with one embodiment of the present invention. Referring to FIG. 3, there is shown an application 302 having a plurality of TCP application posted buffers 304, which may include buffers 304a, 304b, . . . , 304n, and a plurality of generic buffers 326, which may include 326a, 326b, . . . , 304n. A Host adapter 306 may include a network interface card (NIC) processor 308. NIC processor or chip 308 may include a parsing/IP-TCP checks process or processor 312 and a TCP data placement process or processor 328. Host adapter 306 may receive data 318 from a network. The system 300 may also include a TCP notification process or processor 324, a buffer post handler process or processor 322 and a generic buffer handler or processor 320.

In accordance with the inventive arrangements, application 302 may have the capability to recognize when network received data 318 may be received via a specific connection. In this regard, application 302 may post TCP application buffers from the pool of posted buffers 304, for example 304a, prior to the data 318 being received from the network. Generic buffer handler 320 may be configured to post a plurality of generic buffers from the pool of generic buffers 326, for example 326a, and may subsequently notify the TCP data placement process 328 that new generic buffers have been posted and are available. The generic buffers 326 may be configured as a common pool of generic buffers, which may be made available for any connection that requires them.

In operation, the buffer post handler process 322 may handle the posting of TCP application posted buffers 304 by application 302. The buffer post handler process 322 may store any pertinent information related to the buffers. For example, the buffer post handler process 322 may store information such as handles for the posted buffers, which may be communicated to the host adapter 306.

Processor 312 which may run on the NIC chip 312 of host adapter 306 may receive data 318 from the network for a particular connection. Data packets for the received data 318 may normally contain an application header followed by a large or small amount of data. Process 312 may process the data packets for the received data 318 at the IP and TCP level. Preferably, no data placement may be done other than to pass the TCP segments of the received data packets to the TCP data placement process 328, although the invention is not limited in this regard. No data buffering may be required as in conventional systems since the TCP data placement process 328 may always have the capability to place the data in an available buffer. Accordingly, the processing may be very efficient since data flow may be continuous due to the lack of buffering.

Upon receipt of the TCP data packets, the TCP data placement process 328 may compare the received data packets to the range of TCP application posted data buffers 304 that were previously allocated. If there is enough posted buffers 304 available to store the data for the data packets, then the data may be written directly to the posted buffers 304. The TCP data placement process 328 may then issue a notification to the TCP notification process 324, which may inform the application 302 that data has been placed to the TCP application posted buffer 304. In a case where the data placed in the TCP application posted buffer fills an entire TCP application posted buffer, then the TCP data placement process 328 may send a notification to the TCP notification process 324, which may notify the application 302 that the data is ready for processing.

Figure 4:
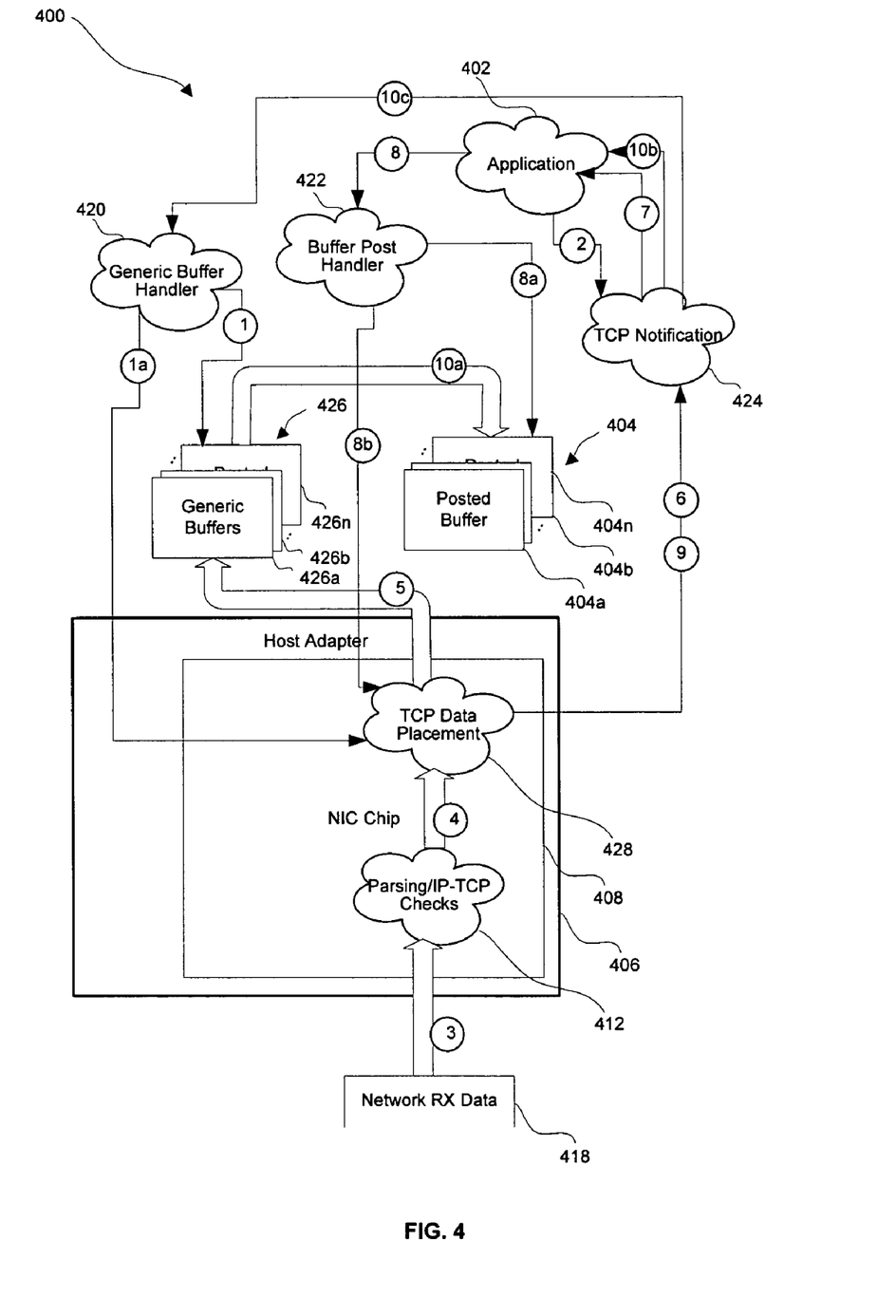
FIG. 4 illustrates a block diagram of a TCP offload system 400 that utilizes non-pre-posted buffers in accordance with one embodiment of the present invention.

In a case where there is not enough TCP application posted buffers 304 available to store the data contained in the received data packets, then a non-pre-posted buffer processing may be followed. As shown in FIG. 4.

FIG. 4 illustrates a block diagram of a TCP offload system 400 that utilizes non-pre-posted buffers in accordance with one embodiment of the present invention. Referring to FIG. 4, there is shown an application 402 having a plurality of TCP Application posted buffers 404, which may include buffers 404a, 404b, . . . , 404n, and a plurality of generic posted buffers 426, which may include 426a, 426b, . . . , 426n. A Host adapter 406 may include a network interface card (NIC) processor or chip 408. NIC processor 408 may include a parsing/IP-TCP check process or processor 412 and a TCP data placement process or processor 428. Host adapter 406 may receive data 418 from a network. The system 400 may also include a TCP notification process or processor 424, a buffer post handler process or processor 422 and a generic buffer handler or processor 420.

In accordance with aspects of the present invention, application 402 may have the capability to wait for input from any of a plurality of TCP connections. Since only a few TCP connections may be active at any given period, the pre-posting of buffers would be a waste of resources. Generic buffer handler 420 may be configured to post a plurality of generic buffers from the pool of generic buffers 426, for example 426a, and may subsequently notify the TCP data placement process 428 that new generic buffers have been posted and are available. The generic buffers 426 may be configured as a common pool of generic buffers, which may be made available for any connection that requires them.

Application 402 may be configured to request the TCP notification process 424 to execute a "peek" operation on the connection carrying incoming received network data 418. The peek operation may be used to determine when data has been received for a connection. Initially, since no data may be received, no action may be taken by the TCP notification process 424.

In operation, process 412 which may run on the NIC chip 412 of host adapter 406, may receive data 418 from the network for a particular connection. Data packets for the received data 418 may normally contain an application header followed by a large or small amount of data. Process 412 may process the data packets for the received data 418 at the IP and TCP level. Preferably, no data placement is done other than to pass the TCP segments of the received data packets to the TCP data placement process 428.

Upon receipt of the TCP data packets, the TCP data placement process 428 may compare the received data packets to the range of TCP application posted data buffers 404, but will find that no buffers were previously posted. Accordingly, a generic buffer from the pool of generic buffers 426, such as 426a, may be allocated from the previously posted generic buffers. The received data may then be written to the allocated generic buffer. A record containing at least a TCP sequence number and the location of the generic buffer containing the written data may be sent to the TCP data placement process 428. The data placement process 428 may subsequently pass the record containing at least the sequence number and buffer location or address to the TCP notification process 424. The TCP notification process 424 may add the information in the record to an internal TCP re-assembly list.

If the data indicated by the notification to process 424 is in the proper sequence relative to any data that was previously indicated to the application, then the TCP notification process 424 may satisfy the previously requested "peek" operation. The information related to the "peek" operation may then be sent to the application 402. Once the application 402 receives information that the "peek" request has been satisfied and there is data available for the connection, application 402 may respond by posting a TCP application buffer to the buffer post handler process 422 to handle the received data indicated by the TCP notification process 424. The buffer post handler process 422 may post the TCP application buffers, save the information about each posted TCP application buffer and pass the buffer handle information to the TCP data placement process 428. The TCP data placement process 428 may be configured to use these buffers to store the information that was placed in the generic buffers.

TCP data placement process 428 may consult its re-assembly list to determine whether the generic buffers containing data are complete. The TCP data placement process may continue to copy the data from the generic buffers 426 to the posted buffers until the data is complete. Upon completion of the data copying, the TCP data placement process 428 may send a notification to the TCP notification process 424, which may indicate completion of the TCP application posted buffer 404. The TCP notification process 424 may then notify the application 402 that the data is ready for processing and also notify the generic buffer handler 420 that the generic buffers which were allocated are now empty. The generic buffer handler 420 may then return the empty buffer the pool of available generic buffers. The inventive arrangements of FIG. 3 and FIG. 4 may operate individually or in conjunction with each other.

Figure 5:
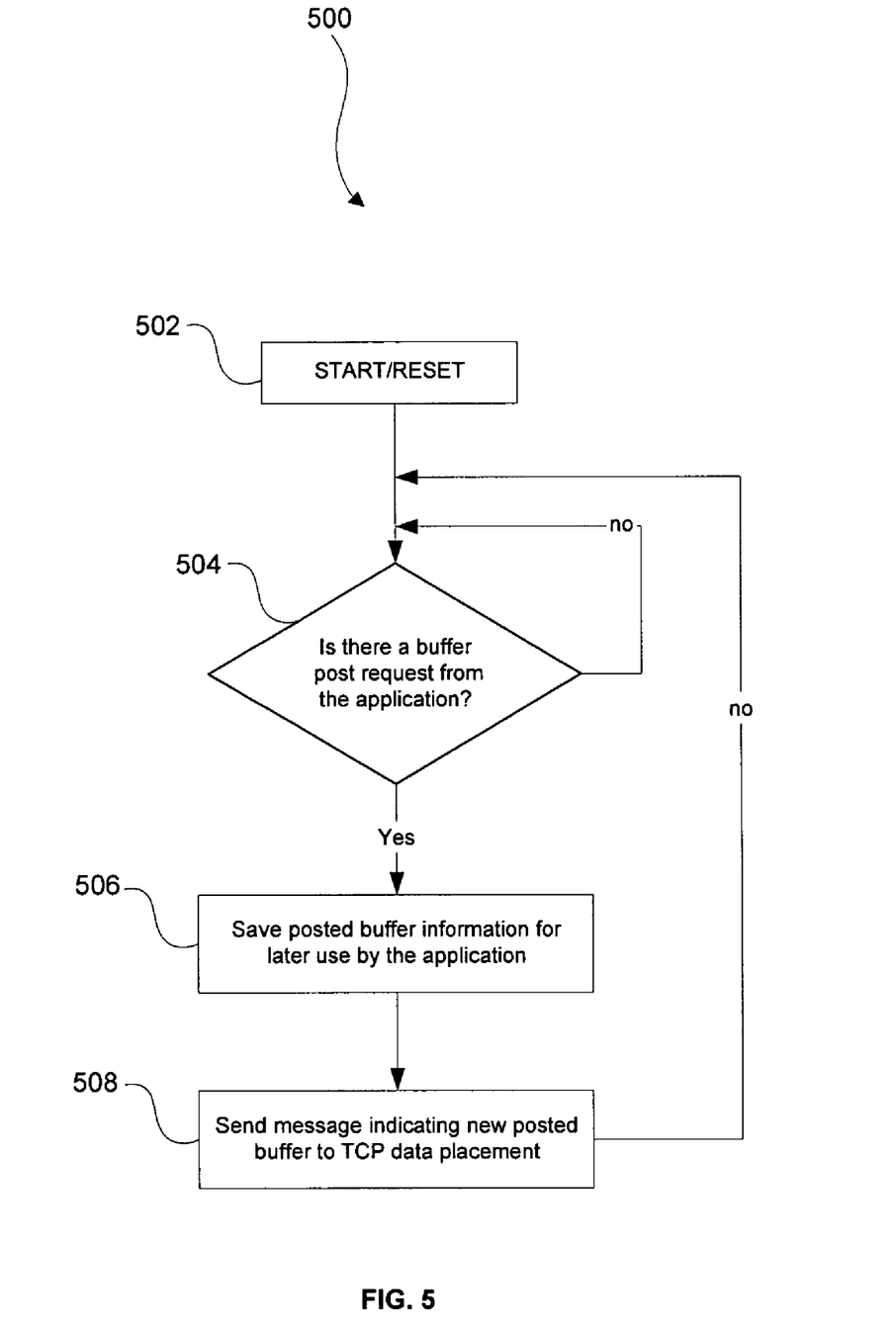
FIG. 5 is a flow chart illustrating exemplary processing steps for a buffer post handler in accordance with embodiments of FIG. 3 and FIG. 4.

In one embodiment of the invention, a system for posting generic buffers for a TCP application may be provided. The system may include a buffer posting handler or processor 322 that may be configured for handling posting of at least one posted TCP application buffer for use by the TCP data placement block 328. FIG. 5 is a flow chart illustrating exemplary processing steps for the buffer post handler process in accordance with the embodiments of FIG. 3 and FIG. 4, for example. The buffer post handler processes 322, 422 of FIG. 3 and FIG. 4 respectively, may be implemented as a finite state machine (FSM). Accordingly, the exemplary steps illustrated in FIG. 5 may represent a state diagram for buffer post handler processes 322 and 422.

Referring to FIG. 5, step 502 may be the start or reset step. In step 504, which may occur subsequent to a start or reset step 502, a check may be as to whether there is a TCP application buffer post request from the application. If there is no buffer post request from the application, then the state machine may remain in a loop and await a buffer post request by re-executing step 504. Whenever a TCP application buffer post request is received, the posted buffer information may be saved for later use by the TCP notification block 324 or 424 of FIG. 3 and FIG. 4 respectively, in step 506. In step 508, the buffer post handler process may send a message to the TCP data placement process, which may indicate the posting of a new TCP application buffer. Control may then return to step 504, where the buffer post handler process awaits another buffer post request from the application.

In an embodiment of the invention, a system for posting generic buffers for use when a TCP application has not designated buffers may be provided. Accordingly, a TCP data placement block or processor 428 of FIG. 4, may be configured to transfer incoming data for a connection to one or more generic buffers and/or TCP application posted buffers depending on a corresponding buffer state for the connection. A data sequence checker may be a part of the TCP data placement block or processor 428 and may be configured to determine whether the incoming data in the generic buffer is in proper sequence. In a case where data may be out of sequence, the data sequence checker may be adapted to assemble the incoming data so that it may be placed in sequence in the posted buffer.

In accordance with the inventive arrangements, A TCP notification processor 424 may be configured to notify and/or send an indication to the TCP application 402 when the TCP application posted buffer is full. After being notified that the buffer is full, the TCP application may process the data. The generic buffer handler or processor 420 may further include an allocating processor configured to allocate a generic buffer from a pool of available generic buffers. The data sequence checker may be configured to determine whether the incoming data in the generic buffer is in a proper sequence. In a case where the data may be out of sequence, a data assembling processor may assemble the incoming data so that it may be placed in sequence in the posted buffer. The TCP notification processor 424, the generic buffer handler or processor 420, data sequence checker may be implemented in software.

Figure 6:
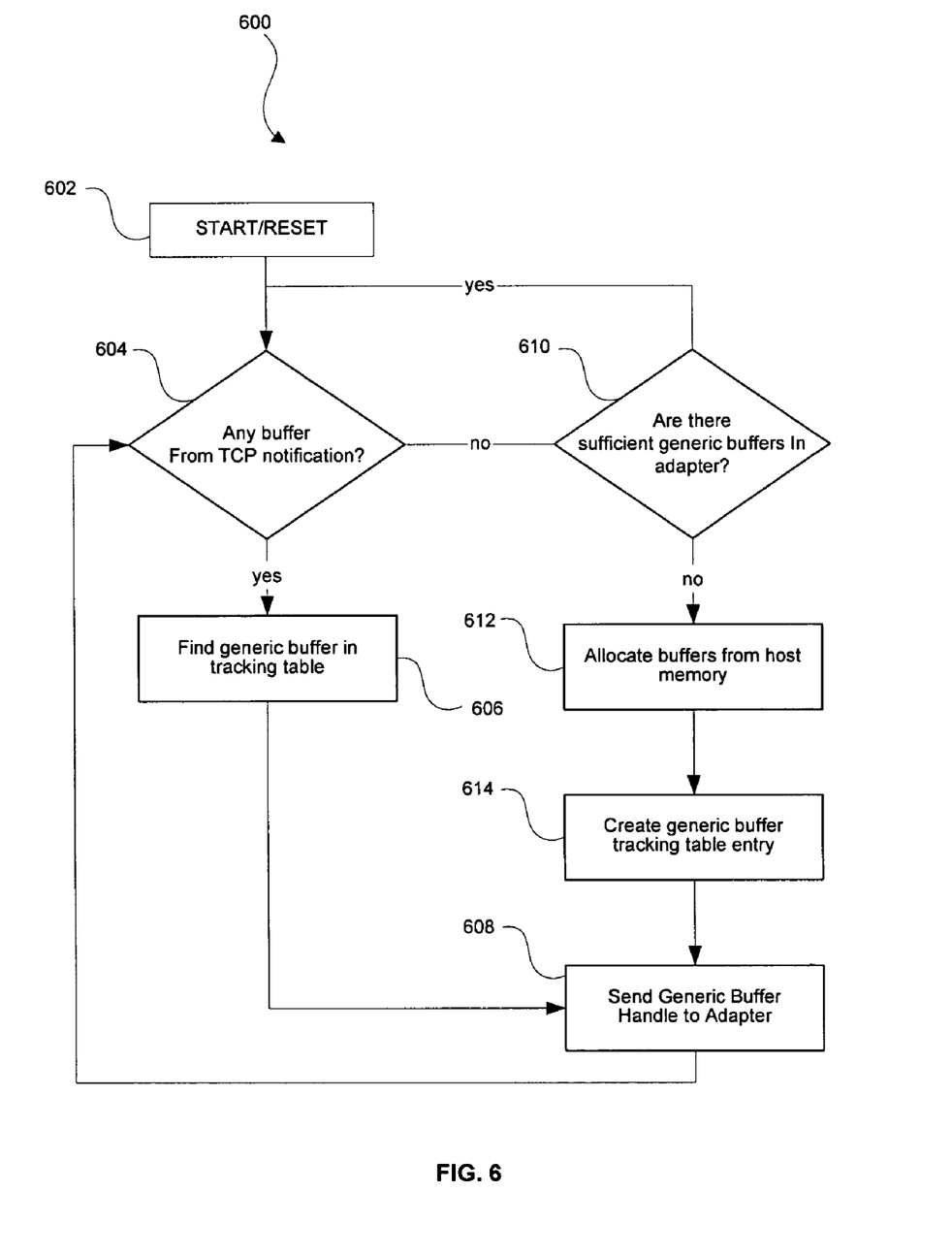
FIG. 6 is a flow chart illustrating exemplary processing steps for a generic buffer handler in accordance with embodiments of FIG. 3 and FIG. 4.

FIG. 6 is a flow chart illustrating exemplary processing steps for the generic buffer handler process in accordance with embodiments of FIG. 3 and FIG. 4, for example. The generic buffer handler processes 320, 420 of FIG. 3 and FIG. 4 respectively, may be implemented as a FSM. Accordingly, the exemplary steps illustrated in FIG. 6 may represent a state diagram for generic buffer handler processes 320 and 420.

Referring to FIG. 6, step 602 may be the start or reset step. In step 604, which may occur subsequently to a start or reset step 602, a check may be as to whether there is any buffer post request from a TCP notification process. If there is a buffer post request from the TCP notification process 324 or 424, then step 606 may be executed and a generic buffer may be found from a buffer tracking table. Once a buffer is found, then control may pass to step 608 where the generic buffer handle may be sent to the adapter. Control may then return to step 604 where the FSM awaits another buffer notification from TCP notification process 424.

Returning to step 604, if no buffer post notification is received from the TCP notification process, then in step 610, a decision is made as to whether there are sufficient buffers in the adapter. If there are insufficient generic buffers in the adapter, then in step 612, memory buffers may be allocated from the host memory. Subsequently, in step 614, a generic buffer tracking table entry may be created. Following step 614, step 608 may be executed and the generic buffer handle may be sent to the TCP data placement process of the host adapter. Returning to step 610, if there are sufficient generic buffers in the adapter, then, in step 610, processing will continue with step 604.

Figure 7:
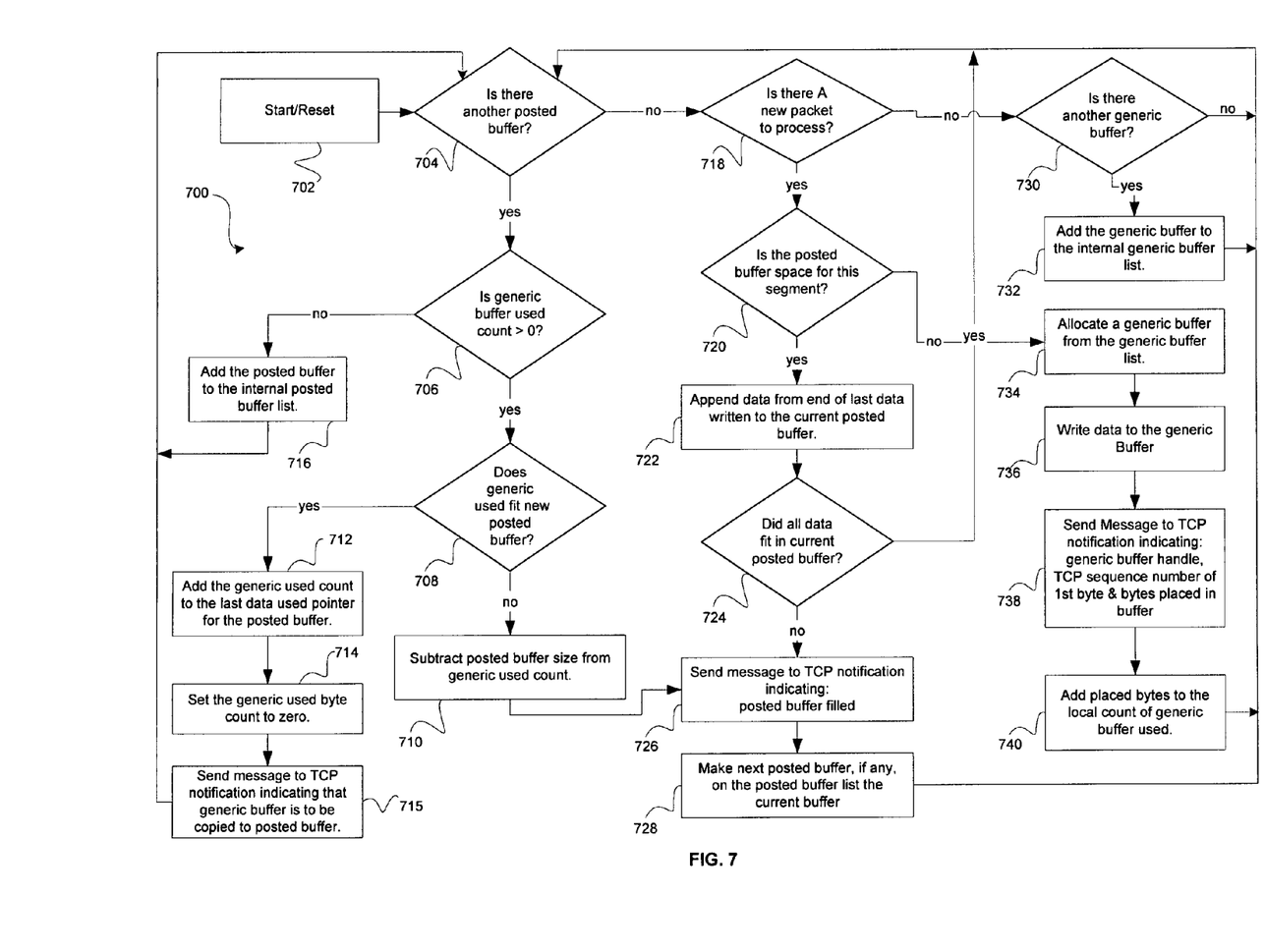
FIG. 7 is a flow chart illustrating exemplary processing steps for a TCP data placement process in accordance with embodiments of FIG. 3 and FIG. 4.

FIG. 7 is a flow chart illustrating exemplary processing steps for the TCP data placement process in accordance with embodiments of FIG. 3 and FIG. 4, for example. The TCP data placement processes 328, 428 of FIG. 3 and FIG. 4 respectively, may be implemented as a FSM. Accordingly, the exemplary steps illustrated in FIG. 7 may represent a state diagram for TCP data placement processes 328 and 428.

Referring to FIG. 7, step 702 may be the start or reset step. In step 704, which may occur subsequent to a start or reset step 702, a decision may be as to whether there is another TCP application buffer posted. If another TCP application buffer is posted, then step 706 may be executed and a decision may be made as to whether a generic buffer used count is greater than zero. If the generic buffer count is greater than zero, then there are available generic buffers. Step 708 may then be executed and a decision may be made as to whether the data stored in the generic buffer will fit into the posted buffer. If the data in the generic buffer may fit in the posted buffer, then step 712 may subsequently be executed.

In step 712, the generic used buffer count may he added to a pointer used to indicate the last data for the TCP application posted buffer. The result may now be the new value for the pointer used to indicate the last data for the TCP application posted buffer. In step 714, a generic used byte count may be set to zero. Subsequently to the execution of step 714, step 715 will indicate that the generic buffer is to be copied to the TCP application posted buffer. The generic buffer handle, TCP application posted buffer address, and number of bytes may be passed to the TCP Notification block. Subsequently to the execution of step 715, control may pass to step 704.

Returning to step 706, if the generic used buffer count is not greater than zero, then there are no generic used buffers available and step 716 may be executed. In step 716, the TCP application posted buffer may be adjusted by adding the TCP application posted buffer to an internal posted buffer list. Subsequently to the execution of step 716, control may pass to step 704.

Returning to step 708, if the generic buffer count exceeds the size of the TCP application posted buffer, then processing will continue with step 710. In this case, step 710 may be executed and the TCP application posted buffer count may be subtracted from the generic used buffer count. Subsequently, step 726 may be executed and a message sent to the TCP notification process, indicating that the TCP application posted buffer may be filled with data from the specified generic buffer In step 728, no action may be taken because this is a new buffer post as was determined in step 704. Subsequently to the execution of step 728, control may pass to step 704.

Returning to step 704, if there was no other TCP application posted buffer, then step 718 may be executed. In step 718, a decision may be made as to whether there is a new packet for the connection to be processed. In step 720, if there is no new packet to be processed, control may then pass to step 730. In step 730, a decision may be made as to whether there is another generic buffer. If there is a generic buffer, then in step 732, the generic buffer may be added to the internal generic buffer list. Subsequently to the execution of step 732, control may pass to step 704. In step 730, if there is no other generic buffer, then control may pass to step 704.

Returning now to step 718, if there is a new packet to be processed, then step 720 may subsequently be executed. In step 720, a decision may be made as to whether the TCP application posted buffer space is allocated to a current data segment. If the TCP application posted buffer space is allocated for the current data segment, then step 722 may be executed. In step 722, the current data segment may be appended to the end of the last data written of the current post buffer. Subsequently, in step 724, a decision may be made as to whether the current data segment was able to fit into the current posted TCP application buffer. If the current data segment was not able to fit into the current posted TCP application buffer, then step 726 may be executed. In step 726, a message may be sent to the TCP notification process, indicating that the TCP application posted buffer has been filled. The data that did not fit in the posted buffer will be handled as if it were more packet data to process. This means that a particular packet may be segmented into as many pieces or portions as may be needed, each piece begin processed from step 718. When the current segment is placed, Control may then pass to step 728. In step 728, the next posted TCP application buffer may be selected, and control may pass to step 704, where a decision may be made as to whether there was another posted TCP application buffer.

Returning to step 720, if the posted TCP application buffer space was not allocated for the current data segment, then step 734 may be executed. In step 734, a generic buffer may be allocated from the generic buffer list. In step 736, data may subsequently be written to the generic buffer. Subsequently, in step 738, a message may be sent to the TCP notification process that may indicate at least information such as a generic buffer handle, a TCP sequence number and a number of bytes placed in the buffer. Step 740 may then be executed. In step 740, the number of bytes placed in the generic buffer may be added to a local count for the number of generic buffers used. Subsequently to the execution of step 740, control may pass to step 704.

Figure 8:
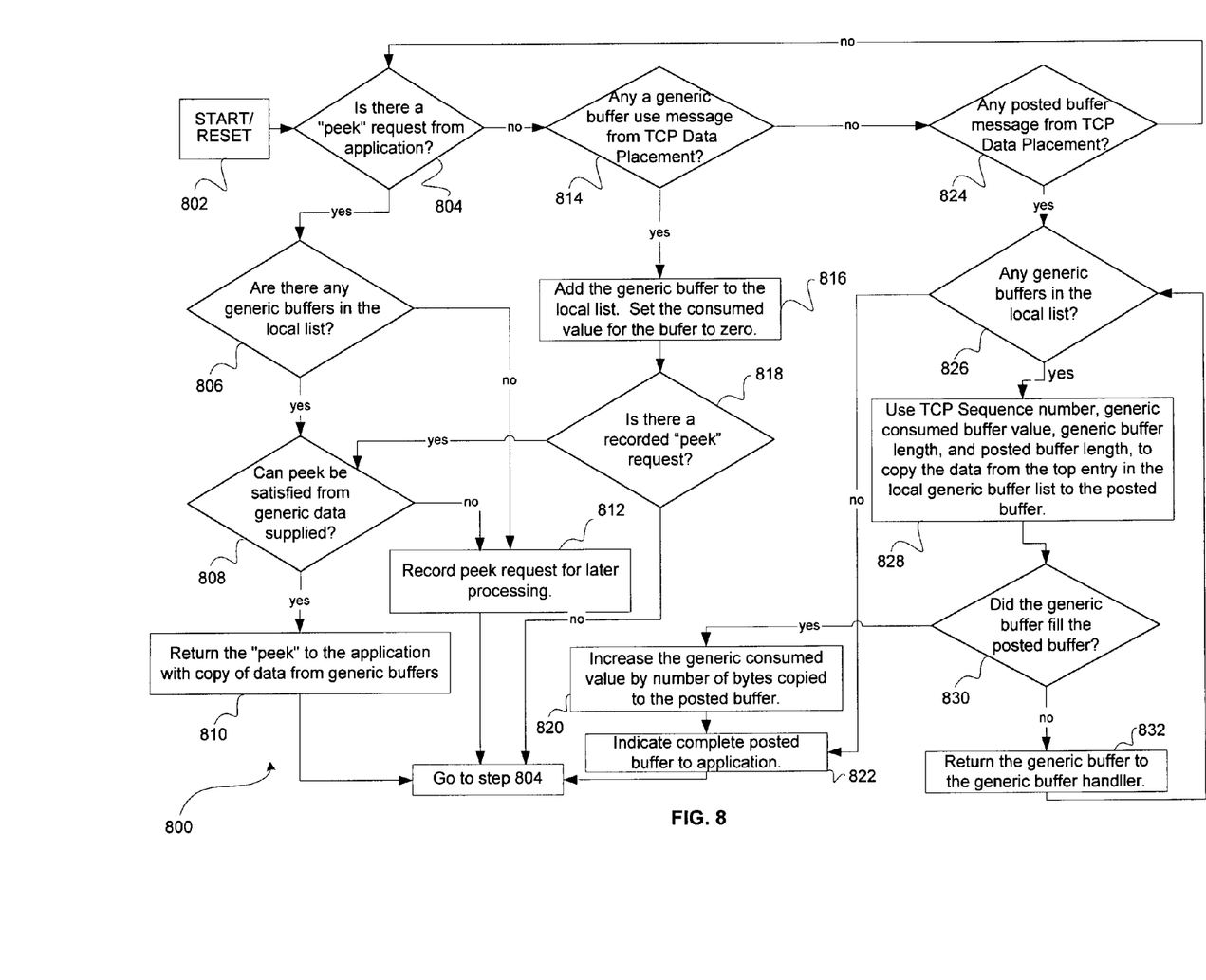
FIG. 8 is a flow chart illustrating exemplary processing steps for a TCP notification process in accordance with embodiments of FIG. 3 and FIG. 4.

FIG. 8 is a flow chart illustrating exemplary processing steps for the TCP notification process in accordance with embodiments of FIG. 3 and FIG. 4, for example. The TCP notification processes 324, 424 of FIG. 3 and FIG. 4 respectively, may be implemented as a FSM. Accordingly, the exemplary steps illustrated in FIG. 8 may represent a state diagram for the TCP notification processes 324 and 424.

Referring to FIG. 8, step 802 may be the start or reset step. In step 804, which may occur subsequently to a start or reset step 802, a "peek" request may be made by the application.

The "peek" request may be a request by the application asking that the application be notified when data for a connection is available. If there is data available for the connection, then in step 806, a determination may be made as to whether there are any generic buffers available in the local list of buffers. If buffers are available, then in step 808, a determination may be made as to whether the "peek" request may be satisfied from the generic data supplied. If the "peek" request may be satisfied, then step 810 may be executed. In step 810, results for the "peek" request for the connection may be returned to the application along with a copy of the data from the generic buffers. Subsequently, step 804 may be executed.

Returning to step 806 or 808, if the "peek" request cannot be supplied based on the data that is in the current local list of generic buffers, then step 812 may be executed. In step 812, the "peek" request may be recorded or stored for subsequent processing. Subsequently, control may pass to step 804.

Returning to step 804, if there is no "peek" request from the application, then in step 814, a decision may be made as to whether there is any generic buffer use message pending from the TCP data placement process. If there is a "generic buffer use" message pending from the TCP data placement process, then in step 816, the generic buffer may be added to a local list of generic buffers. A storage area that corresponds to the saved generic buffer will show that no bytes from that buffer have been used. Step 818 may then be executed.

In step, 818, a decision may be made as to whether there is a recorded "peek" request. If there is no recorded "peek" request pending, then control may pass to step 804. If there is a recorded "peek" request pending, then step 808 may be executed, where a decision may be made as to whether the "peek" request may be satisfied from the generic data available, and if so, then step 810 may return a copy of this data to satisfy the peek operation. To "satisfy" a peek means to remove the recorded peek entry for the peek, since it will not need to be processed again.

Returning to step 814, if there is no "generic buffer use" message pending from the TCP data placement process, then in step 824, a decision may be made as to whether there is any "posted buffer" message from the TCP data placement process. If there is no "posted buffer" message from the TCP data placement process, then control may pass to step 804. If there is a "posted buffer" message from the TCP data placement process, then in step 826, a decision may be made as to whether there is any generic buffer available in the local list of generic buffers. If there is no generic buffer available in the local list of generic buffers, then in step 822, an indication may be sent to the application notifying the application that the TCP application buffer specified in the "posted buffer" message is complete, and the TCP application may process the data. Subsequently to the notification indicating completion of the buffer, control may then pass to step 804.

In step 826, if there is a generic buffer available in the local list of generic buffers, step 828 may subsequently be executed. In step 828, parameters such as, the posted buffer TCP sequence number, generic buffer handle, the generic buffer TCP sequence number, generic buffer length and posted buffer length may be used to calculate one or more copy operations that will move the generic buffer data into the posted buffer in the correct order. On completion of the copying, in step 830, a decision may be made as to whether the generic buffer filled the posted buffer. If the posted buffer is not filled, then in step 832, the generic buffer may be returned to the generic buffer handler process.

Subsequently to step 832, step 826 may be executed. Steps 826, 828, 830 and 832 may be re-executed until data in the generic buffers fill the TCP application posted buffer, so long as there is a generic buffer available in the local list. In step 830, if the TCP application posted buffer is filled, then step 820 may be executed. In step 820, the number of bytes used in the generic buffer may be increased by the number of bytes copied to the TCP application posted buffer. Step 822 may then be executed, where an indication may be sent to the application notifying the application that posted TCP application buffer is now complete. Control may then pass to step 804.

Notably, the exemplary steps in accordance with the inventive arrangements of FIG. 5, FIG. 6, FIG. 7 and FIG. 8 are not intended to be a limitation on the buffer post handler, the generic buffer handler process, the TCP data placement process and the TCP notification process. Accordingly, other steps are possible without departing from the true spirit of the inventive arrangements.

In another embodiment of the invention, it may be advantageous to have the data copy operation of the TCP Notification executed in a remote location from within the host adapter. This may significantly reduce the CPU overhead while still using the host based generic buffers. For example, referring to FIG. 3, the host adapter 306 may copy data from the generic buffers 326 to the posted buffers 304. This may provide a zero-copy host CPU overhead. The term zero-copy CPU overhead may mean that data may be placed directly in the posted buffer for the application when it is first written from the adapter.

Referring to the TCP notification process of FIG. 8, zero-copy CPU overhead may be achieved through step 828. In this regard, the TCP notification process may be configured to send a request to the host adapter 306, requesting that the host adapter 306 copy information from the generic data buffers 326 to the posted buffer 304. Hence, in step 828, information including at least data such as, the TCP sequence number, the generic, consumed buffer value, the generic buffer length and the posted buffer length may be sent to the host adapter 306.

In yet another embodiment, the generic buffers may be housed partially within the host adapter. This may provide increased system performance when the set of connections handled by the host adapter does not require more generic buffer space than will fit on the host adapter, but may fall back to using the host based generic buffers if requirements exceed the memory available on the host adapter. In another aspect of the invention, the generic buffer handler and/or the buffer post handler may be located within the host adapter with little or no effect on the location of the generic buffers or posted buffers themselves. The TCP Notification processor or block may be implemented within the host adapter. Notwithstanding, it should be recognized that there may be other ways of partitioning these operations while still allowing some or all of TCP re-assembly storage to be done in buffers located in the host memory.

In accordance with aspects of the invention, the use of generic buffers may eliminate the need for TCP segment buffers in the host adapter, since data may be placed directly from a small packet buffer into either the generic buffers or the posted TCP application buffers. This may translate to significant cost savings since large on-chip memory is required. Particularly with TCP applications that post buffers before data may be received, the use of generic buffers in accordance with the inventive arrangements may result in significantly increased communication speeds and reduced latency. These and other advantages may be attributed to the fact that data for the completed buffer does not have to be copied to the host after the packet that fills the buffer has been received, or the TCP application buffer has been posted.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

The invention claimed is:

1. A method for posting buffers for a non-posting TCP application, the method comprising:
   posting at least one generic buffer located in a memory external to a host adapter; and
   transferring incoming data for a TCP connection to said at least one posted generic buffer prior to the non-posting TCP application posting a TCP application posted buffer for said incoming data.

2. The method according to claim 1, comprising allocating at least one generic buffer from a pool of available generic buffers upon receipt of said incoming data for said TCP connection.

3. The method according to claim 2, comprising storing at least a portion of said incoming data in said allocated at least one generic buffer, if said TCP application posted buffer is unable to accommodate said incoming data.

4. The method according to claim 1, comprising determining whether said incoming data for said TCP connection transferred to said at least one posted generic buffer is in sequence.

5. The method according to claim 4, wherein said determining comprises assembling said incoming data in said at least one posted generic buffer, if said incoming data is out of sequence.

6. The method according to claim 1, comprising polling said at least one posted generic buffer by the non-posting TCP application to determine when said at least one posted generic buffer contains data for said TCP connection.

7. The method according to claim 6, comprising, in response to said polling, notifying the non-posting TCP application when said incoming data is stored in said at least one posted generic buffer.

8. The method according to claim 1, comprising posting at least one generic buffer prior to said transferring of said incoming data for a TCP connection to at least a portion of available TCP application buffers.

9. The method according to claim 1, comprising posting at least one posted generic buffer located in a memory internal to said host adapter.

10. A machine-readable storage, having stored thereon a computer program having at least one code section for posting buffers for a non-posting TCP application, the at least one code section executable by a machine for causing the machine to perform the steps comprising:
    posting at least one generic buffer located in a memory external to a host adapter; and
    transferring incoming data for a TCP connection to said at least one posted generic buffer prior to the non-posting TCP application posting a TCP application posted buffer for said incoming data.

11. The machine-readable storage according to claim 10, comprising code for allocating at least one generic buffer from a pool of available generic buffers upon receipt of said incoming data for said TCP connection.

12. The machine-readable storage according to claim 11, comprising code for storing at least a portion of said incoming data in said allocated at least one generic buffer, if said TCP application posted buffer is unable to accommodate said incoming data.

13. The machine-readable storage according to claim 10, comprising code for determining whether said incoming data for said TCP connection transferred to said at least one posted generic buffer is in sequence.

14. The machine-readable storage according to claim 13, comprising code for assembling said incoming data in said at least one posted generic buffer if said incoming data is out of sequence.

15. The machine-readable storage according to claim 10, comprising code for polling said at least one posted generic buffer by the non-posting TCP application to determine when said at least one posted generic buffer contains data for said TCP connection.

16. The machine-readable storage according to claim 15, comprising code for notifying the non-posting TCP application when said incoming data is stored in said at least one posted generic buffer in response to said polling.

17. The machine-readable storage according to claim 10, comprising code for posting at least one generic buffer prior to said transferring of said incoming data for a TCP connection to at least a portion of available TCP application buffers.

18. The machine-readable storage according to claim 10, comprising code for posting at least one posted generic buffer located in a memory internal to said host adapter.

19. A system for posting buffers for a non-posting TCP application, the system comprising:
    at least one generic buffer located in a memory external to a host adapter;
    at least one processor that posts said at least one generic buffer located in said memory external to said host adapter; and
    said at least one processor transfers incoming data for a TCP connection to said at least one posted generic buffer prior to the non-posting TCP application posting a TCP application posted buffer for said incoming data.

20. The system according to claim 19, wherein said at least one processor allocates at least one generic buffer from a pool of available generic buffers upon receipt of said incoming data for said TCP connection.

21. The system according to claim 20, wherein said at least one processor stores at least a portion of said incoming data in said allocated at least one generic buffer, if said TCP application posted buffer is unable to accommodate said incoming data.

22. The system according to claim 19, wherein said at least one processor determines whether said incoming data for said TCP connection transferred to said at least one posted generic buffer is in sequence.

23. The system according to claim 22, wherein said at least one processor assembles said incoming data in said at least one posted generic buffer, if said incoming data is out of sequence.

24. The system according to claim 19, wherein said at least one processor polls said at least one posted generic buffer by the non-posting TCP application to determine when said at least one posted generic buffer contains data for said TCP connection.

25. The system according to claim 24, wherein said at least one processor notifies the non-posting TCP application when said incoming data is stored in said at least one posted generic buffer in response to said polling.

26. The system according to claim 19, wherein said at least one processor posts at least one generic buffer prior to said transferring of said incoming data for a TCP connection to at least a portion of available TCP application buffers.

27. The system according to claim 19, wherein said at least one processor posts at least one posted generic buffer located in a memory internal to said host adapter.

28. The system according to claim 19, wherein said at least one processor is one or more of a NIC, a generic buffer handler, a buffer post handler, an application, a TCP notifier and/or a TCP data placement processor.

29. A method for posting buffers for a non-posting TCP application, the method comprising:
  posting at least one generic buffer located in a memory external to a host adapter;
  transferring incoming data for a TCP connection to said at least one posted generic buffer prior to the non-posting TCP application posting a TCP application posted buffer for said incoming data;
  determining whether said incoming data for said TCP connection transferred to said at least one posted generic buffer is in sequence;
  assembling said incoming data in said at least one posted generic buffer, if said incoming data is out of sequence; and
  ordering said at least one posted generic buffer using a TCP data placement sequence number for said out of sequence incoming data.

30. A machine-readable storage, having stored thereon a computer program having at least one code section for posting buffers for a non-posting TCP application, the at least one code section executable by a machine for causing the machine to perform the steps comprising:
  posting at least one generic buffer located in a memory external to a host adapter;
  transferring incoming data for a TCP connection to said at least one posted generic buffer prior to the non-posting TCP application posting a TCP application posted buffer for said incoming data;
  determining whether said incoming data for said TCP connection transferred to said at least one posted generic buffer is in sequence;
  assembling said incoming data in said at least one posted generic buffer, if said incoming data is out of sequence; and
  ordering said at least one posted generic buffer using a TCP data placement sequence number for said out of sequence incoming data.

31. A system for posting buffers for a non-posting TCP application, the system comprising:
  at least one generic buffer located in a memory external to a host adapter; and
  at least one processor that posts said at least one generic buffer located in said memory external to said host adapter,
  wherein said at least one processor transfers incoming data for a TCP connection to said at least one posted generic buffer prior to the non-posting TCP application posting a TCP application posted buffer for said incoming data,
  wherein said at least one processor determines whether said incoming data for said TCP connection transferred to said at least one posted generic buffer is in sequence,
  wherein said at least one processor assembles said incoming data in said at least one posted generic buffer if said incoming data is out of sequence, and
  wherein said at least one processor orders said at least one posted generic buffer using a TCP data placement sequence number for said out of sequence incoming data.

* * * * *